Nov. 9, 1948.  C. E. HOLLYDAY, JR  2,453,319
TUBE HOLDING DEVICE

Filed Feb. 21, 1945  2 Sheets-Sheet 1

*INVENTOR.*
Charles E. Hollyday Jr.
BY
*Donald W. Farrington*
ATTORNEY

Nov. 9, 1948.   C. E. HOLLYDAY, JR   2,453,319
TUBE HOLDING DEVICE
Filed Feb. 21, 1945   2 Sheets-Sheet 2
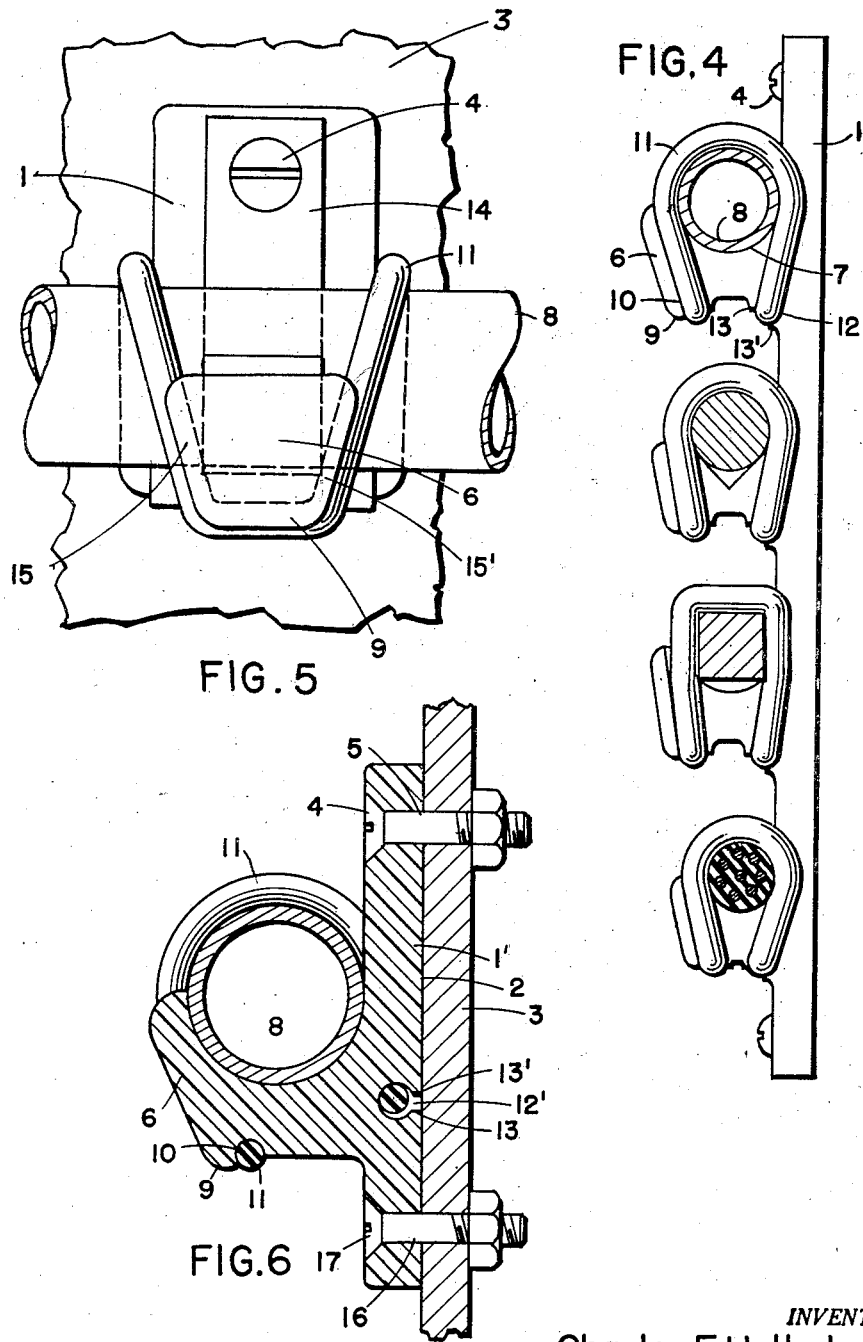
INVENTOR.
Charles E. Hollyday Jr.
BY
Donald W. Farrington
ATTORNEY Patented Nov. 9, 1948

2,453,319

UNITED STATES PATENT OFFICE 2,453,319

TUBE HOLDING DEVICE

Charles E. Hollyday, Jr., Baltimore, Md., assignor to The Glenn L. Martin Company, Middle River, Md., a corporation of Maryland Application February 21, 1945, Serial No. 578,963

6 Claims. (Cl. 248—74)

My invention relates to an improved tube holding device and more particularly a holder that includes a rigid bracket and an elastic clamping ring arranged to quickly and easily secure and support a tube, bar, or bundle of wires.

This invention fulfills the need for an inexpensive holding device that is easy to install and secures any type of tube, bar, or bundle of wires firmly in place. It is adapted to be attached to any type of supporting structure such as a wall, bulkhead, beam, girder, or instrument panel. The production cost is low since the bracket which forms the major part of the device can be molded, cast, pressed, or otherwise formed, from any suitable material such as plastic, aluminum, aluminum alloy, or like materials, possessing the requisite strength and durability. The bracket when molded from light weight high dielectric material also provides an efficient insulating means. This factor is especially desirable in a holder used by the aircraft industry where it is important that weight be kept to the minimum. The prior art practices include the mounting of insulating material on a metallic bracket and securing the tube, cable, or conductor thereto with a tie wire. The weight of such combination adversely affects its use in aircraft. Other prior art methods require a metal strip with a cooperative insulating sleeve or bushing through which the supported member must be drawn. In case of replacement where using the last named method it is necessary to dismount the entire assembly. A further disadvantage characteristic of either of the prior art tube supports is that removal of the tube from the support requires removal of the fastener that mounts the support on the wall, or the like. Such support removal is often complicated by other installations that render the support fastener inaccessible.

The present invention provides a bracket having a mounting base, a supporting ledge projecting from the base shaped to partially embrace the tube or like article to be supported, and an elastic clamping ring adapted to be looped around the bracket and the article supported to hold the article on its supporting ledge.

The bracket may be molded from high strength dielectric material providing a strong light weight holding unit. The clamping ring arranged to be looped over the member to be held provides a fastening means that can be quickly and rapidly manipulated without disassemblage of the bracket from its mounting on the wall, or the like. The characteristics of the bracket and clamping ring of the materials may advantageously be such as to reduce excessive vibration by damping the vibrations arising in the member supported. This is of particular advantage in present day high speed transportation equipment.

It is among the objects of my invention to provide means for supporting and holding a tube, bar, or bundle of wires, including a rigid bracket having a supporting ledge and a cooperative elastic clamping ring arranged to loop over and hold such tube, bar, or bundle of wires, in place on said ledge.

It is a further object of my invention to provide a supporting device for an elongated article having a mounting base with an integrally formed projecting ledge shaped to partially embrace the supported article and wherein an elastic ring is looped about the ledge and the article to be supported to clamp the article on the ledge.

A further object is to provide a supporting bracket according to the preceding objects from which a supported member can be quickly removed or replaced by detaching one end of the elastic loop without removal of the bracket.

Other objects of this invention will become apparent from the following description when taken in conjunction with the accompanying drawings in which like numbers refer to like parts in different views.

In the drawings:

Figure 4 is an end plan view of a multiple unit of my invention;

Figure 5 is a perspective view of the holder of my invention incorporating an electric bonding strap; and Figure 6 is a vertical section view of a modified form of the invention.

Figures 1, 2:
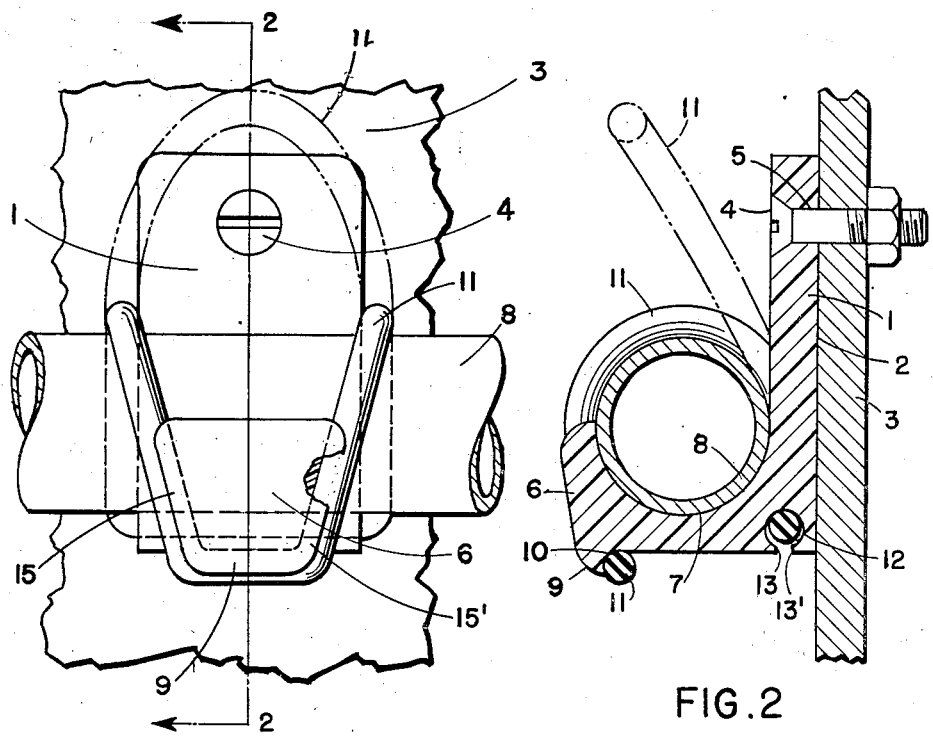
Figure 1 is an elevation showing the holder of my invention in position securing a section of tube.
Figure 2 is a vertical section view on line 2—2 of Figure 1.
Figure 3:
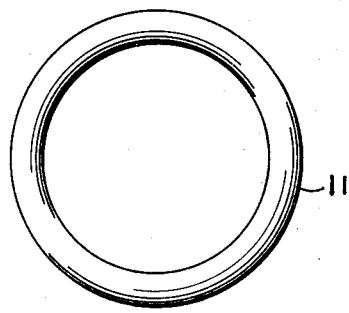
Figure 3 is an elevation of a resilient clamping ring employed in my invention.

Referring to the drawing in detail I have illustrated in Figure 1 the holder of my invention attached to a wall structure. The base 1 is preferably formed of molded plastic material with a flat mounting support 2 adapted to be rigidly attached to a wall or other supporting structure 3 by bolt 4, or a like securing means, inserted through aperture 5 of the base. Formed integrally with the base 1 and extending outwardly therefrom is a supporting ledge 6 having a receiving channel 7 formed to receive and partially embrace the tube 8, or a like elongated article, to be held in place by clamping ring 11. The bottom of bracket 6 is provided with a depending lip, or lug 9, which depends below the base of a groove 10 arranged to receive a portion of the resilient clamping ring 11. A ring retaining groove 12 is provided at the underside of the holder with shoulders 13 and 13'. The grooves 10 and 12 are arranged with respect to channel 7 so that the elastic ring when latched in groove 10 will embrace that portion of the article to be supported remote from the bottom of the channel at each side of the supporting ledge. Clamping ring 11 composed of rubber, or like elastic material, is positioned with respect to the bracket or holder and the article to be supported so that the ring must be stretched to be "snapped" into place over the lug 9. It is preferable that the space allowed between shoulders 13 and 13' of groove 12 be less than the diameter of ring 11 so as to retain the ring against accidental dislodgement when released from the tensioned holding position shown in Figure 2. The sides of ledge 6 are grooved to provide side grooves 15 and 15' of sufficient depth to protect ring 11 from mechanical injury and increase the snugness of fit between ring 11, tube 8, and ledge 6. To mount an article in the holder one side of ring 11 is forced into groove 12 and the other side of the ring is temporarily raised above ledge 6 (see dotted line positioning in Figs. 1 and 2), to allow for the placing of the article such as tube 8 in channel 7. The free portion of ring 11 is then drawn down over tube 8 and "snapped" under depending lip 9 and into grooves 10, 15 and 15'. The elasticity of the rubber permits the ring to be snapped into place ordinarily without the use of tools. A large area of the ring 11 is brought into frictional contact with the surface of the tube 8 due to the wrapped around portion of the ring as it clamps the tube in place which effectively restrains the supported article against longitudinal movement in the channel 7. Release of tube 8 from the holder is readily accomplished by unhooking the clamping ring 11 from groove 10 and depending lip 9. Ring 11 will spring to the released dotted line position above tube 8 with the opposite circumferential portion retained in groove 12. With ring 11 in this position tube 8 may be removed, adjusted or replaced without in any way affecting the permanent mooring of the holder base 1. It is one of the advantages of the holder of my invention that it permits removal, repair or replacement of a tube or wire without tools and without disturbing adjacent installations. It is also a relatively simple maintenance operation to replace one or more wires from a bundled assemblage of wires so supported and held.

On those installations where a number of tubes, or like objects, are to be supported in a horizontal position a multiple ledge holder as shown in Figure 4 may prove more desirable than a series of single units. In such form a variety of sized ledges designed to hold different sized and shaped tubes, bars, or bundles of wires, can be readily provided.

In certain types of installations it is necessary that the metal tubing or conduits be electrically bonded to the supporting structure. This requirement can be readily met in a holder of my invention by the use of the strap of metal 14 inserted between the tube 8 and the holder bracket 6 and the base 1, as shown in Figure 5. The strap 14 consisting of a conductive metal such as copper or aluminum is secured by bolt 4 thereby providing a metallic connection between tube 8 and supporting structure 3.

For use on installations where the holder may be subjected to considerable side thrust the form shown in Figure 6 may be employed wherein an additional bolt 17 is inserted through aperture 16 in base 1' as extended. The retaining groove 12' is preferably arranged in the base 1' although the retaining ring arrangement of Figure 1 may be adapted to this form.

For the purpose of this description I have described and illustrated the use of a clamping ring of annular form having a circular cross section, however, it is to be understood that other forms can be suitably used and that the retainer is adapted to being molded, stamped from sheet stock or extruded, as found most desirable.

Although three species of my invention have been shown and described in detail, it will be appreciated that certain colorable changes in structure may be made without departing from the spirit and scope of the appended claims.

I claim as my invention:

1. A tube holding device comprising a base adapted for mounting on a supporting structure and having an integrally formed ledge portion, said ledge having a channeled top surface adapted to support a tube, the free end of said ledge having grooved sides and bottom, a restricted entrant ring holding groove formed in said holder remote from the channeled top surface of the ledge and a ring having rubber-like physical characteristics arranged in said grooves about the supported tube and in the grooves at the free end of the ledge.

2. A tube holding device for securing a tube to a supporting wall or the like comprising an integrally molded base and ledge, said ledge projecting away from the base to provide a support having a top surface formed concave to receive a tube placed thereon, a retaining lug at the underside thereof and a retaining groove spaced from said lug to engage a ring having rubber-like physical characteristics arranged to form two loops around the ledge with the ring portion between the loops disposed around the tube to be supported.

3. A holder for securing an article to a supporting wall or the like comprising an integrally molded base and ledge, said ledge being formed to project at a right angle from said base to provide a support having a top surface formed to receive an article placed thereon and having two spaced ring grooves at the underside thereof, and a ring having rubber-like physical characteristics arranged to form two loops around the ledge with the ring portion between the loops disposed around the article to be supported.

4. A tube holding device for securing a tube to a supporting wall or the like comprised of a bracket consisting of a wall member and a ledge that projects outwardly from said wall member, securing means by which the bracket is secured to a supporting wall, said ledge being formed with a top surface adapted to receive a tube placed thereon, a U-shaped groove adjacent the free end of said ledge, a ring having rubber-like physical characteristics arranged to form two loops under the ledge and two loops over a tube placed on said ledge with one of said loops of the ring positioned in the U-shaped groove adjacent the free end of the ledge.

5. A holder for securing a tube-like article to a supporting wall or the like comprised of a bracket consisting of a wall member and projecting ledge having a top surface adapted to receive an article to be held, securing means adapted to secure the bracket to a supporting wall, a ring having rubber-like physical characteristics, a restricted entrant retaining groove positioned adjacent said wall member and below the plane of the top surface of the ledge, a U-shaped groove formed in the free end of said ledge arranged to receive and partially encircle a portion of the ring hooked in the retaining groove and looped over an article placed on the projecting ledge.

6. A holder for securing a tube-like article to a supporting wall or the like comprising an integrally molded base and ledge, said ledge projecting away from the base with a top surface formed concave to receive an article placed thereon, a retaining lug formed as a depending lip on the underside of said ledge and a ring having rubber-like physical characteristics arranged to form two loops under the ledge with the portions of the ring between the loops disposed around the article to be supported.

CHARLES E. HOLLYDAY, Jr.

REFERENCES CITED

The following references are of record in the file of this patent:

UNITED STATES PATENTS

| Number | Name | Date |
| --- | --- | --- |
| D. 30,441 | Wahlert | Mar. 28, 1899 |
| 1,030,200 | Miller | June 18, 1912 |
| 1,302,354 | Friedmann et al. | Apr. 29, 1919 |
| 1,303,249 | Brown | May 13, 1919 |
| 1,755,971 | Smalley | Apr. 22, 1930 |
| 1,817,268 | Rohlfs | Aug. 4, 1931 |
| 2,330,835 | Miller | Oct. 5, 1943 |
| 2,390,385 | Pooler | Dec. 4, 1945 |